United States Patent [19]

Yagasaki et al.

[11] 4,439,886
[45] Apr. 3, 1984

[54] WIPER DEVICE

[75] Inventors: Akio Yagasaki, Tokyo; Masaki Watanabe, Saitama, both of Japan

[73] Assignee: Honda Giken Kogyo Kabushiki Kaisha, Tokyo, Japan

[21] Appl. No.: 356,692

[22] Filed: Mar. 10, 1982

[30] Foreign Application Priority Data

Mar. 30, 1981 [JP] Japan .................................. 56-45419
Mar. 30, 1981 [JP] Japan .................................. 56-45420

[51] Int. Cl.³ .............................................. B60S 1/34
[52] U.S. Cl. .................................. 15/250.2; 15/250.16; 15/250.34; 296/78.1
[58] Field of Search ... 15/250.3, 250.13, 250.16–250.2, 15/250.34, 250.35; 296/84 R, 78.1

[56] References Cited

U.S. PATENT DOCUMENTS

| | | | |
|---|---|---|---|
| 2,043,218 | 6/1936 | Anderson | 15/250.2 X |
| 2,934,965 | 5/1960 | Perry | 15/250.17 X |
| 3,025,554 | 3/1962 | Ziegler | 15/250.17 |
| 4,010,976 | 3/1977 | Shields | 296/78.1 |
| 4,355,838 | 10/1982 | Hickman | 296/78.1 |
| 4,370,774 | 2/1983 | Bienert et al. | 15/250.2 |

FOREIGN PATENT DOCUMENTS 1021131 2/1966 United Kingdom ............. 15/250.34

*Primary Examiner*—Peter Feldman
*Attorney, Agent, or Firm*—Sughrue, Mion, Zinn, Macpeak and Seas

[57] ABSTRACT

A wiper device capable of increasing urging force of a wiper blade against a windshield of a vehicle during wiping operation and decreasing urging force of the wiper blade during out of service thereof and resting the blade at its resting zone of the windshield. The wiper device comprises the wiper blade, a wiper arm having one end pivotably supporting the wiper blade, a drive means for providing swinging movement of the wiper arm, at least one biasing spring having one end connected to the wiper arm and a movable unit adapted to change biasing force of the spring, the spring having the other end connected to the movable unit. The wiper arm has the other end pivotally connected to a wiper head coupled to a wiper shaft driven by a drive means.

13 Claims, 14 Drawing Figures

WIPER DEVICE

BACKGROUND OF THE INVENTION

The present invention relates to a wiper device for use in a motorcycle or automobile.

Recently, the requirements for energy saving and improved driving performance have remarkably enhanced the reduction in weight of automobiles, motorcycles, and other land vehicles. For that purpose, new materials have been explored, and thickness of various parts have been reduced.

A windshield is not an exception, but a lot of efforts have been made to develop a thinner windshield and to provide newly developed resinous material.

Generally, a wiper blade is slidingly pivotted over a front surface of a windshield with a certain amount of pressure in order to rub water or dust therefrom. The blade usually remains urged against the windshield even during non-service period. If the wiper remains out of use for a long period, or if there is any great change in ambient temperature, the blade is likely to stick to the windshield, or the material of which the blade is made is likely to undergo deterioration, and further, the blade may be deformed into undesirable shape.

A windshield of resinous material is particularly liable to get scratched by the wiper during operation. Even when the wiper is not in use, such scratching is likely to arise due to the vibration of the vehicle, or the like, if the wiper blade is left in intimate contact with the windshield under pressure.

SUMMARY OF THE INVENTION

It is therefore, an object of the present invention to overcome the above-mentioned drawbacks and disadvantages and to provide an improved wiper device.

Another object of the invention is to provide such wiper device capable of eliminating any scratch or damage of a windshield during non-service period, yet providing sufficient pressure of a wiper blade to the windshield to perform rubbing or wiping operation.

Still another object of the invention is to provide such wiper device, wherein urging force application of the wiper blade toward the windshield is selectively changeable in accordance with the initiation or termination of the wiping operation.

These and other objects are attained in accordance with the present invention by providing means for varying the pressure of the wiper blade toward the windshield. The wiper device includes a wiper blade pivotally supported by one end of a wiper arm whose other end is pivotally connected to a wiper head connected to a wiper shaft connected to a drive means such as a motor.

According to the means for varying pressure of the wiper blade in one embodiment of the present invention, a motor casing is slidably secured within a base cover mounted on a base. The motor casing is integrally provided with a sleeve having outer peripheral surface formed with a spiral groove engageable with a cam pawl projecting from the base. Upon manual rotation of a dial, the motor casing slidingly moves within the base cover because of the engagement with the spiral groove and the cam pawl, to thereby move the wiper shaft along travel direction of the vehicle. A coil spring is provided between the wiper head and the wiper arm, so that the urging force of the wiper blade toward the windshield is changeable in response to the movement of the wiper shaft.

According to the means for varying pressure of the wiper blade in a second embodiment of this invention, a bell crank for controlling the wiper pressure is pivotally supported on a pin by which the wiper arm is pivotally supported on the wiper head. An arm spring is provided between one end of the bell crank and the wiper arm. The wiper shaft is formed with a slide groove in which a sliding member, a ball and a control rod are received. A locking groove, which is perpendicular to the slide groove, is formed in the vicinity of the rear end of the slide groove. A stop projects perpendicularly from the control rod, and is selectively engageable in the locking groove. The control rod has a rear end provided with a lever. The sliding member has a front end engaged with the other end of the bell crank. The wiper shaft includes an integrally formed reduction gear which is engaged with a pinion formed integrally with the output shaft of a motor. An abutment defines a limit to the rearward movement of the stop.

Upon disengagement of the stop from the locking groove, the sliding member is retracted to reduce the biasing force of the arm spring, to thereby reduce urging force of the blade against the shield. Reversely upon engagement between the stop and the locking groove, the sliding member urges the bell crank to pivot, so that the biasing force of the coil spring is increased, to thus increase the urging force of the blade to the shield.

According to the means for varying pressure of the wiper blade in a third embodiment of this invention, instead of the bell crank of the second embodiment, a cam is rotatably supported about the pin, and the cam has each surface connected to one end of the coil spring whose other end connected to the wiper arm. The coil springs are provided around the pin. Rotation of the cam renders the torsion force of the coil spring to be changed, to thereby change the urging force of the wiper blade to the windshield. The rotation of the cam is provided by the movement of the sliding member as in the second embodiment.

DETAILED DESCRIPTION OF THE PREFERRED EMBODIMENTS

Figure 1:
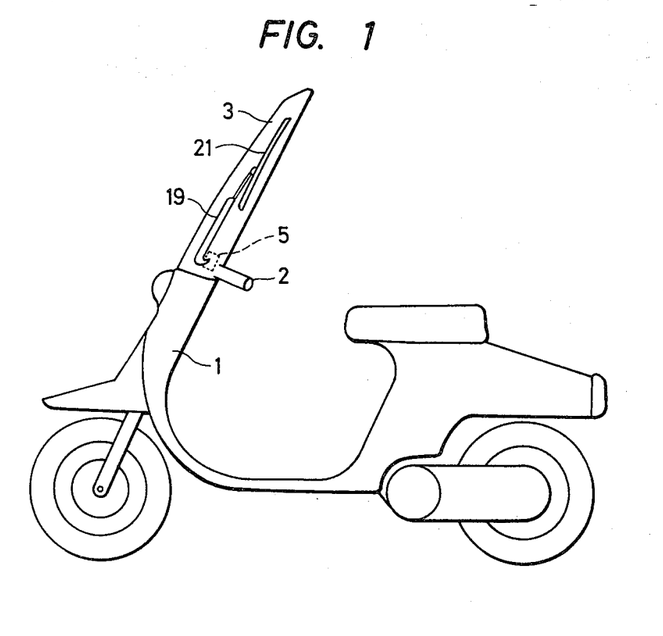
FIG. 1 is a side elevational view of a motor scooter provided with a wiper device embodying this invention.

A first embodiment of the present invention will be described with reference to FIGS. 1 through 9. A wiper device embodying this invention is employed in a motor scooter as shown in FIG. 1. The motor scooter has a front body 1 on which a handlebar 2 is rotatably supported. A windshield 3 which can fully withstand the pressure of wind when the scooter is running is rigidly secured to the handlebar 2.

Figure 5:
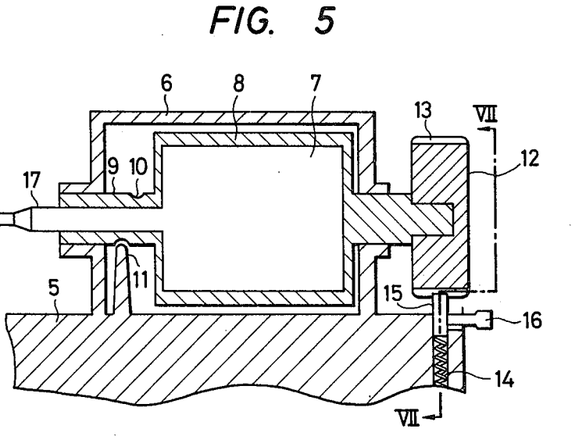
FIG. 5 is a fragmentary, enlarged vertical cross-sectional view showing an essential portion according to a first embodiment of the invention.
Figure 8:
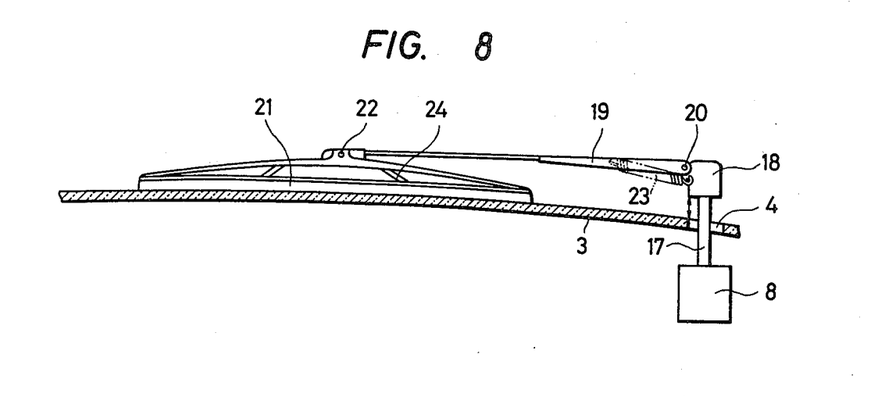
FIGS. 8 and 9 are cross-sectional views taken along the lines VIII—VIII and IX—IX, respectively, of FIG. 2.

A wiper unit base 5 is provided adjacent to the left-hand portion (shown on this side of FIG. 1) of the handlebar 2. As shown in FIGS. 5 and 8 a motor casing 8 containing a motor 7 is disposed within a base cover 6 on the base 5 so that a wiper shaft 17 (mentioned later) is rotated about an axis extending longitudinally of the vehicle. A sleeve 9 is slidably disposed relative to the base cover 6. The sleeve 9 projects from the motor casing 8, and has an outer peripheral surface formed with a cam groove 10, while a cam pawl 11 projecting from the base 5 is engaged with the cam groove 10. The windshield 3 has a hole 4 through which the wiper shaft 17 extends.

A manual dial 12 is connected integrally to the base end of the motor casing 8, and a plurality of locking cam grooves 13 are formed at the outer peripheral surface of the dial 12 at equi-distances along circumferential direction thereof. A locking member 15 slidingly projects from the wiper unit base 5, and is engageable with one of the locking cam grooves 13 by virtue of the biasing force of a coiled compression spring 14 positioned in the base 5. The locking member 15 includes a laterally projecting locking button 16 extending perpendicular thereto.

The wiper shaft 17 is rotatable relative to the sleeve 9 and is rotated within a prescribed angle by the motor 7. The wiper shaft 17 has a free end to which a wiper head 18 is secured as shown in FIG. 8. A wiper arm 19 is pivotally connected to the wiper head 18 by a pin 20, and has a free end on which an ordinary wiper blade 21 is pivotally supported by a pin 22 through a yoke 24. An arm spring 23 is connected between the wiper head 18 and the wiper arm 19 to urge the wiper blade 21 against the windshield 3.

Figure 2:
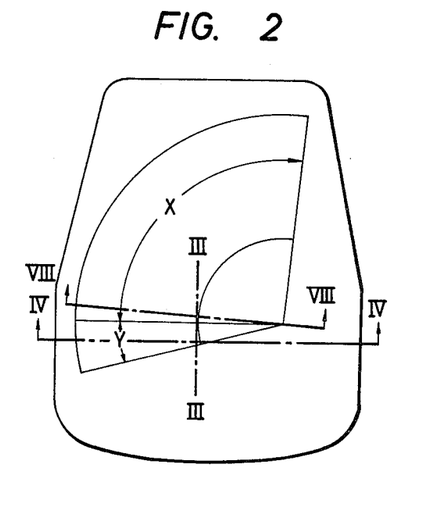
FIG. 2 is a front elevational view of a windshield.
Figure 3:
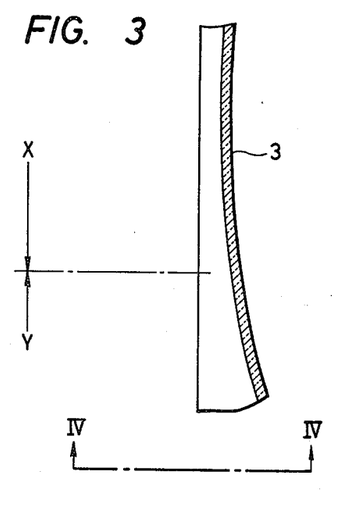
FIG. 3 is a vertical sectional view taken along the line III—III of FIG. 2.
Figure 4:
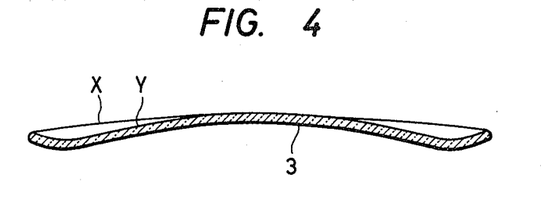
FIG. 4 is a view taken along the line IV—IV of FIG. 3.

The windshield 3 shown in FIGS. 2 to 4 includes a nearly flat upper portion having a large radius of curvature and defining an area X within which the wiper is movable when in use, and a lower portion having a smaller radius of curvature and defining an area Y in which the wiper is positioned when not in use.

Figure 6:
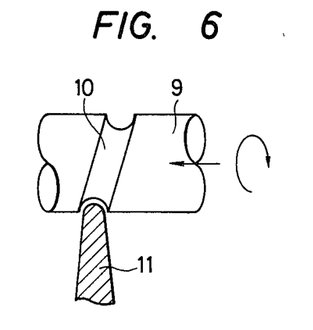
FIG. 6 is a fragmentary, enlarged side elevational view showing an essential portion of the first embodiment.
Figure 7:
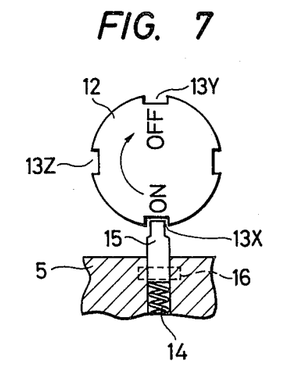
FIG. 7 is a vertical sectional view taken along the line VII—VII of FIG. 5.

If the locking member 15 is interlocked with the "ON" locking cam groove 13X, the cam pawl 11 engages the cam groove 10 of the sleeve 9 so as to rearwardly (rightwardly in FIG. 5) retract the motor casing 8 and the sleeve 9, as shown in FIGS. 5 to 7. In this case, the wiper blade 21 is pressed strongly against the front surface of the windshield 3 as shown in FIG. 8, while the motor 7, the wiper shaft 17, the wiper arm 19 and the wiper blade 21 are rotated clockwise in FIG. 2, whereby the wiper blade 21 is brought into the position in the area X for normal operation. Upon rotation of the manual dial 12 to its "ON" position, the motor 7 is energized, so that the wiper arm 19 and the wiper blade 21 are swung in the area X about the wiper shaft 17, and accordingly, the wiper blade 21 wipes the front surface of the windshield 3.

Figure 9:
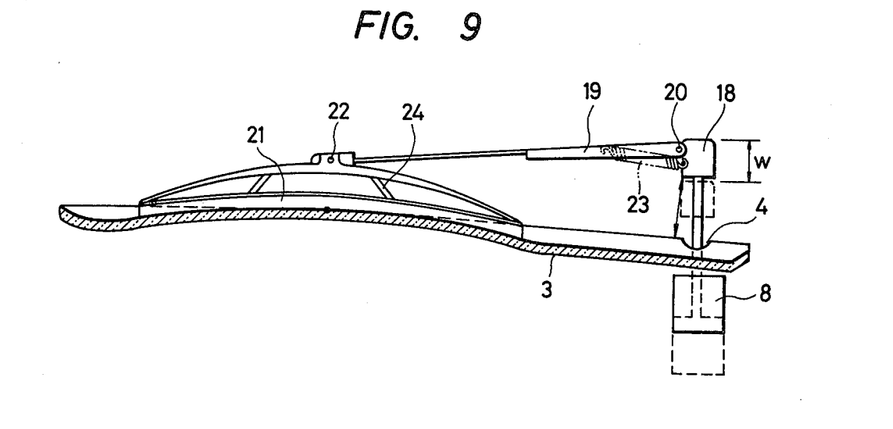

Reversely, the manual dial 12 can be brought to its "OFF" position, when the locking button 16 is depressed to disengage the locking member 15 from the "ON" locking cam groove 13X and the manual dial 12 is turned by 180° to render the locking member 15 to be brought into engagement with the "OFF" locking cam groove 13Y of the manual dial 12. By this reverse operation, since the cam pawl 11 engages the cam groove 10, the sleeve 9 moves frontwardly (leftwardly in FIG. 5). In this case, the wiper blade 21 is pressed against the front surface of the windshield 3 with a lower pressure as shown in FIG. 9, while the motor 7, the wiper shaft 17, the wiper arm 19 and the wiper blade 21 are rotated in counterclockwise direction in FIG. 2, whereby the wiper blade 21 is positioned in the area Y in which it is kept in its inoperative position. Upon rotation of the dial 12 to its "OFF" position, the motor 7 is deenergized, and the wiper arm 19 and the wiper blade 21 are left in their inoperative position in the area Y.

In the event the arm spring 23 exerts too high a tension, or in the event it is desired to reduce the pressure with which the wiper blade 21 is urged against the windshield 3 when it is used, it is possible to engage the locking member 15 with the "HALF-ON" locking cam groove 13Z located between the "ON" locking cam groove 13X and the "OFF" locking cam groove 13Y. In this position of the dial 12, the motor 7 is energized and the motor casing 8 and the wiper head 18 are retracted to a position halfway of the stroke W of their movement shown in FIG. 9 to thus reduce the urging force of the blade 21 toward the windshield 3.

Figure 10:
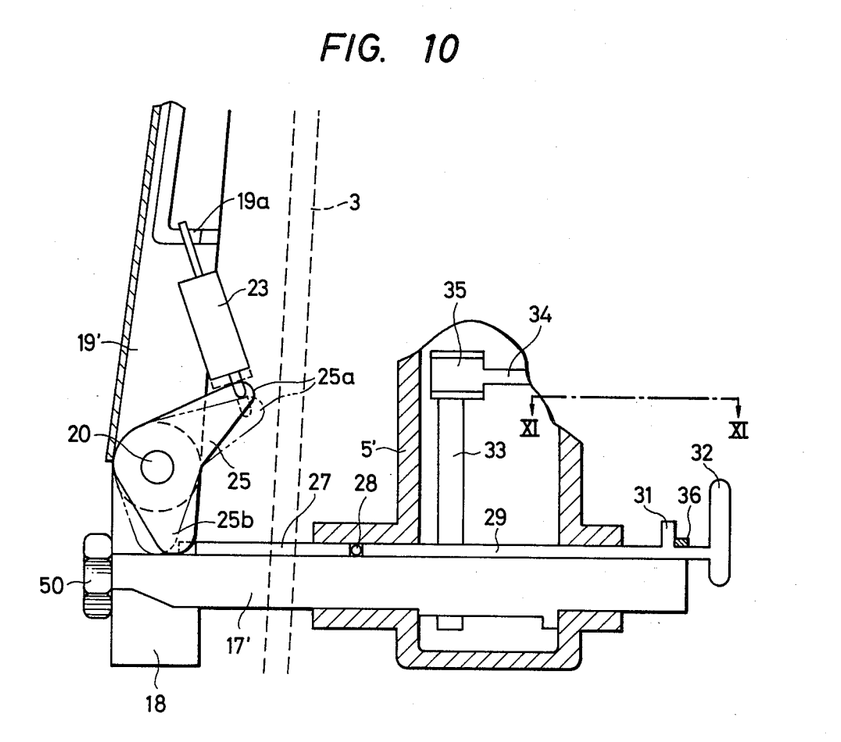
FIG. 10 is a fragmentary, enlarged vertical sectional view showing a second embodiment of this invention.
Figure 11:
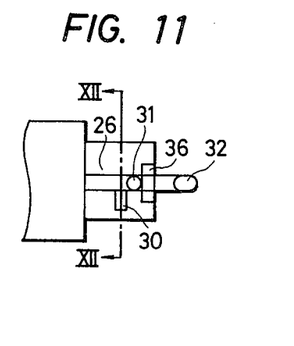
FIG. 11 is a view taken along the line XI—XI of FIG. 10.
Figure 12:
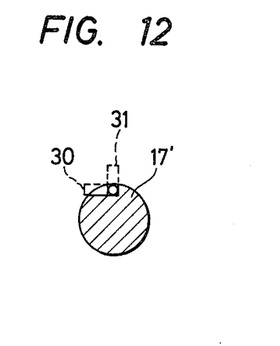
FIG. 12 is a cross-sectional view taken along the line XII—XII of FIG. 11.

A second embodiment of the present invention is shown in FIGS. 10 to 12. According to the first embodiment shown in FIGS. 1 to 9, the pressure with which the wiper blade 21 is urged against the windshield 3 is controlled by the integral advance or retraction of the motor casing 8, the wiper shaft 17 and the wiper head 18, in order to change the biasing force of the arm spring 23. According to the second embodiment, as shown in FIG. 10, a wiper shaft 17' is rotatably supported by the base 5' and extends forwardly of the windshield 3 through a hole 4 (FIG. 8) formed therein. The wiper shaft 17' has a free end to which a wiper head 18' is fixedly secured by a nut 50.

A wiper arm 19' and a bell crank 25 for controlling the wiper pressure are pivotably supported on the wiper head 18' by a pin 20. The wiper arm 19' has a free end on which a yoke 24 is pivotably supported by a pin 22. The yoke 24 carries a wiper blade 21 as in the first embodiment.

A coiled spring 23 has one end connected to one end 25a of the bell crank 25 and the other end connected to a spring hook 19a on the wiper arm 19'.

As shown in FIG. 11 the wiper shaft 17' has a longitudinally extending slide groove 26 having a U-shaped cross section in which a sliding member 27, a ball 28 and a control rod 29 are received.

A locking groove 30 extending perpendicular to the slide groove 26 is formed in the vicinity of the rear end of the slide groove 26. A stop 31 integrally projects perpendicularly from the control rod 29 and is removably engageable with the locking groove 30.

The control rod 29 has a rear end provided with a lever 32. An abutment 36 extends from a stationary portion of the vehicle and defines a limit to the rearward movement of the stop 31. The sliding member 27 has a front end engaged with the other end 25b of the bell crank 25.

A reduction gear 33 is integrally mounted on the wiper shaft 17' and is engaged with a pinion 35 formed integrally with an output shaft 34 of a motor (not shown).

If the lever 32 is pushed forward and turned by 90° in counterclockwise direction as viewed in FIG. 12, the stop 31 is engaged with the locking groove 30 and the motor is energized, whereby the wiper blade 21 is placed in operation and swung in an area X shown in FIG. 2.

If, on the other hand, the lever 32 is retracted until the stop 31 contacts the abutment 36, the motor is deenergized and the wiper blade 21 is left in its inoperative position in an area Y. More specifically, a limit switch may, for example, be employed to detect the approach of the wiper blade 21 to the area Y and cause the wiper blade 21 to continue swinging in the same direction by a certain angular distance so that it can move into the area Y, while a timer can, for example, be used for turning off the power supply to the motor. The windshield 3 employed in the second embodiment is the same as used in the first embodiment as shown in FIGS. 2 to 4.

With the structure, thus organized, according to the second embodiment, when as shown in FIG. 10 the lever 32 is pushed forward from its retracted position, and turned by 90° in counterclockwise direction as viewed in FIG. 12, the stop 31 is engaged with the locking groove 30, while the control rod 29, the ball 28 and the sliding member 27 are displaced frontwardly and held in position. In response to the displacement, the bell crank 25 is pivotted about the pin 20 in clockwise direction (FIG. 10) into its position shown by a two-dot chain line and the coiled spring 23 is expanded. As a result, the spring 23 exerts an increased tension on the wiper arm 19' to render the blade 21 to be urged toward the windshield 3, whereby the wiper blade 21 is pressed strongly against the front surface of the windshield 3 as shown in FIG. 8.

In this case, the forward movement of the lever 32 causes the motor (not shown) to be energized and the motor rotates its output shaft 34 reciprocally along circumferential direction at a prescribed rate. The rotation of the shaft 34 is transmitted through the reduction gear 33 to the wiper shaft 17' and the wiper arm 19' to thus swing them in the area X, whereby the front surface of the windshield 3 is wiped.

Reversely, if the lever 32 is turned by 90° in clockwise direction as viewed in FIG. 12 to disengage the stop 31 from the locking groove 30 and thereafter retracted, the control rod 29, the ball 28 and the sliding member 27 are retracted. In this case, the bell crank 25 is rotated about the pin 20 in counterclockwise direction (FIG. 10) into its position shown by a solid line in FIG. 10, whereupon the coiled spring 23 contracts. As a result, the tension exerted by the spring 16 on the wiper arm 19' is decreased, so that the wiper blade 21 is urged against the front surface of the windshield 3 with a reduced pressure, as shown in FIG. 9.

If the lever 32 is retracted, the wiper blade 21 does not swing back in the area X when it has approached the area Y, but continues swinging in the same direction by a certain angular distance until it moves into the area Y, whereupon the motor (not shown) is deenergized to leave the wiper blade 21 in its position in the area Y.

It will be noted that the second embodiment shown in FIGS. 10 to 12 operates substantially in the same manner and provides substantially the same results as that of the first embodiment shown in FIGS. 1 to 9.

According to the foregoing embodiments, when the wiper is in operative condition, the retraction of the motor casing 8 and the sleeve 9 (first embodiment) or the frontward movement of the sliding member 27, ball 28 and the control rod 29 (second embodiment) serves to increase the biasing force of the coil spring 23, to thereby cause the wiper blade 21 to be strongly urged against the front surface of the windshield 3 as shown in FIG. 8. Since in the area X, the windshield 3 has a large radius of curvature, and provides a nearly flat surface, the wiper blade 21 can provide a nearly straight shape, and causes a yoke 24 to undergo a large amount of elastic deformation. This arrangement permits the wiper blade 21 to effectively remove rain water, muddy water, earth or sand, or dust from the front surface of the windshield 3 in the area X.

On the other hand, when the wiper is non-operative condition, the frontward movement of the motor casing 8 and the sleeve 9 (first embodiment) or rearward movement of the sliding member 27, ball 28 and the control rod (second embodiment) serves to decrease the biasing force of the coil spring 23, so that the urging force of the wiper blade 21 to the windshield 3 is decreased.

When the wiper is not used, however, the advance movement of the motor casing 8 and the sleeve 9 (first embodiment) causes the arm spring 23 to contract, and the pressure with which the wiper blade 21 is urged against the front surface of the windshield 3 by the spring 23 is reduced. Therefore, the wiper blade 21 does not stick to the front surface of the windshield 3, nor is the blade material deteriorated, even if the wiper is out of service for a long period, or even if there is a great change in ambient temperature. Since in the area Y, the windshield 3 has a smaller radius of curvature and presents a more greatly curved surface, the elastic deformation of the yoke 24 is reduced. The wiper blade 21 is left substantially in its free position and snugly fits the surface of the windshield 3, and as a result the wiper blade 21 is not deformed. Since the wiper blade 21 contacts the surface of the windshield 3 in a stable condition along its entire length even when out of the service, rattling of the wiper arm 19 and the wiper blade 21 is prevented.

Figure 13:
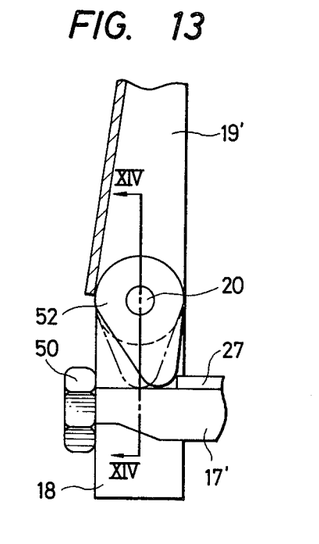
FIG. 13 is a cross-sectional view showing an essential portion according to a third embodiment of this invention.
Figure 14:
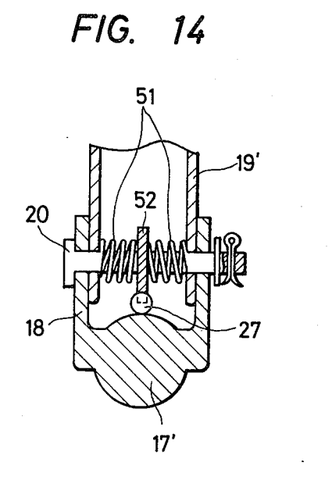
FIG. 14 is a cross-sectional view taken along the line XIV—XIV of FIG. 13.

A third embodiment of the present invention is shown in FIGS. 13 and 14. In the third embodiment, urging force of the wiper blade 21 toward the windshield 3 is changed by the torsion force of a coil spring 51.

Instead of the bell crank 25 of the second embodiment, a cam 52 is rotatably fitted about the pin 20 on which the wiper arm 19' is pivotably supported. A coiled torsion spring 51 is provided on each side of the cam 52 and encircles the pin 20. Each spring 51 has an inner end engaged with the cam 52, while the outer end thereof is connected to the wiper arm 19'. The free end of the sliding member 27 is engageable with the lower end of the cam 52. The device shown in FIGS. 13 and 14 operates substantially in the same manner, and provides the same results as that shown in the foregoing embodiment. That is, upon engagement between the cam 52 and the sliding member 27, the cam 52 is rotated about the pin 20, to thereby change the torsioning force of the coiled springs 51, whereby the orientation of the wiper arm 19' is changed to thus change the urging force of the wiper blade to the shield 3.

Although the windshield 3 has been shown as comprising an upper portion having a large radius of curvature and defining the area X in which the wiper blade is in its operative position, and a lower portion having a small radius of curvature and defining the area Y in which the wiper blade is in its inoperative position, it is also possible to apply this invention to a windshield having a substantially equal radius of curvature in its upper and lower portions.

Although embodiments hereinabove described are directed to the device employed in a two-wheeled vehicle, it is also possible to apply this invention to a three- or four-wheeled, or any other land vehicle.

Further, it is also possible to employ any other mechanism if it can urge the wiper blade against the front surface of the windshield with a higher pressure when the wiper is in its operative position and with a lower pressure when it is in its inoperative position.

According to this invention, there is, thus, provided a wiper device including a blade, an arm supporting the blade in intimate contact with a windshield, and a motor or like means for driving the arm, characterized by comprising means for varying the pressure applied to the windshield by the arm through the blade, as hereinbefore described. When the wiper is used, the pressure varying means is brought to its operative position in which the pressure with which the blade is urged against the windshield is increased, so that the blade may remove water or dust from the windshield. When the wiper is not used, the pressure varying means is brought to its inoperative position in which the pressure with which the blade is urged against the windshield is decreased to prevent the wiper blade from sticking to the windshield and protect the windshield from being scratched by the blade.

Although the invention has been described in detail with reference to the embodiments, it is to be understood that this invention is not limited by those embodiments but that further modifications or variations may be made, if required, without departing from the spirit of this invention.

What is claimed is:

1. In a wiper device for a land vehicle windshield having an operation zone over which a wiper blade is adapted to oscillate and a rest zone engageable by a wiper blade in the rest position including a wiper blade adapted to wipe said operation zone of said windshield, a wiper arm having one end pivotally supporting said wiper blade and drive means for providing oscillating movement to said wiper arm, the improvement comprising means for selectively varying the urging force of said wiper blade against said windshield including at least one coil spring having one end connected to said wiper arm and a moveable member connected to the other end of said coil spring, said moveable member being moveable to a first position upon energization of said drive means to increase the urging force of said spring when said wiper blade is operating in the operation zone regardless of the speed of the vehicle and being moveable to a second position upon deenergization of said drive means to decrease the urging force of said spring when said wiper blade is in the rest position in said rest zone.

2. The improvement of claim 1, wherein said windshield has two different curvatures to vary urging force of said wiper blade thereagainst via said coil spring.

3. The improvement of claim 1, wherein said movable member having at least two operating positions, said wiper blade being operated in said operation zone of said windshield at one position of said movable member and being in the rest position in said rest zone thereof at the other position of said movable member.

4. The improvement of claim 1, wherein said means for varying urging force further comprises:
(a) a drive means unit base integrally provided on said vehicle;
(b) a movable casing adapted to house said drive means, said casing integrally providing a sleeve member;
(c) a stationary base cover supporting said movable casing and mounted on said unit base;
(d) a wiper shaft having one end connected to said drive means, said wiper shaft being rotatably supported by said sleeve member, and said sleeve being slidably supported by said stationary base cover;
(e) a dial integrally provided at said casing and concentrical with said sleeve for rotating said casing, said casing and said sleeve together with said wiper shaft being movable along travel direction of said vehicle; and,
(f) a wiper head connected to the other end of said wiper shaft, said other end of said coil spring being connected to said wiper head, and other end of said wiper arm being pivotally connected to said wiper head, said wiper head serving as said movable member.

5. The improvement of claim 4, wherein said sleeve member has an outer peripheral surface formed with a spiral groove, and further comprises a stationary pawl member extending from said unit base and engaged with said spiral groove, upon rotation of said dial, said sleeve member, said movable casing together with said wiper shaft and said wiper head being moved by the guiding of said pawl member relative to said spiral groove.

6. The improvement of claim 5, further comprising a locking means for locking the rotational position of said dial, said locking means comprising a locking member slidably supported by said unit base, a spring for urging said locking member toward said dial, and at least two locking grooves formed at an outer peripheral surface of said dial to selectively engage said locking member.

7. The improvement of claim 6, wherein said locking grooves are formed at diametrically opposite sides of said dial and extend along travel direction of said vehicle, engagement between said locking member and one of said locking grooves providing a signal to energize said drive means, and engagement between said locking member and the other of said locking groove providing a signal to position said wiper blade at said rest zone and to deenergize said drive means.

8. The improvement of claim 2, wherein said windshield includes a nearly flat upper portion having a large radius of curvature and defining said operation zone for said wiper blade, and a lower portion having a small radius of curvature and defining said rest zone, said windshield being formed with a hole through which said wiper shaft extends.

9. The improvement of claim 1, wherein said means for varying urging force further comprises:

(a) a drive means unit base integrally provided on said vehicle;
(b) a wiper shaft rotatably supported by said unit base;
(c) a wiper head coupled to one end of said wiper shaft;
(d) a bell crank pivotably supported to said wiper head by a pin around which other end of said wiper arm is pivotably supported, said other end of said coil spring being connected to said bell crank which serves as said movable member; and
(e) an actuation means for actuating said bell crank.

10. The improvement of claim 9, wherein said actuation means comprises:
(a) a sliding member slidably fitted to said wiper shaft, said sliding member having one end engageable with said bell crank; and
(b) a control rod slidably fitted to said wiper shaft, said control rod having one end confronting the other end of said sliding member and the other end integrally provided with an operation lever.

11. The improvement of claim 10, further comprising a locking means for selectively maintaining a position of said sliding member, said locking means comprising: a stop extending from said control rod, and an abutment post abuttable on said stop to limit retraction of said sliding member upon disengagement between said sliding member and said bell crank, said wiper shaft being formed with a fitting groove with which said sliding member and said control rod are fitted, and said wiper shaft further formed with a locking groove engageable with said stop to maintain engagement of said sliding member with said bell crank.

12. The improvement of claim 9 further comprising a pinion concentrically connected to an output shaft of said drive means, and a reduction gear integrally mounted on said wiper shaft and in meshing engagement with said pinion, said pinion and said reduction gear being housed within said unit base.

13. The improvement of claim 1, wherein two coil springs are provided and further comprising:
(a) a wiper shaft having one end connected to said drive means;
(b) a wiper head coupled to the other end of said wiper shaft;
(c) a pin mounted on said wiper head to pivotally support the other end of said wiper arm and to dispose said two coil springs therearound within said wiper head;
(d) a cam plate rotatably supported by said pin and positioned inside of said wiper head, said cam plate having opposite surfaces each connected to each one end of said two coil springs, each other end of said coil springs being connected to said wiper arm, said cam plate serving as said movable means; and
(e) a cam actuation means for selectively pivotting said cam plate to change torsional force of said coil springs.

* * * * *